US012691667B2

(12) United States Patent
Tuytens et al.

(10) Patent No.: US 12,691,667 B2
(45) Date of Patent: Jul. 28, 2026

(54) TEXTILE COVERING FOR ROTOR BLADES AND USE OF THE TEXTILE COVERING

(71) Applicant: Concordia Textiles nv, Waregem (BE)

(72) Inventors: Manu Tuytens, Waregem (BE); Carl Baekelandt, Waregem (BE); Kurt Inghelbrecht, Waregem (BE); Rik Gekiere, Waregem (BE)

(73) Assignee: Concordia Textiles nv, Waregem (BE)

( * ) Notice: Subject to any disclaimer, the term of this patent is extended or adjusted under 35 U.S.C. 154(b) by 0 days.

(21) Appl. No.: 18/719,374

(22) PCT Filed: Dec. 16, 2022

(86) PCT No.: PCT/IB2022/062367
§ 371 (c)(1),
(2) Date: Jun. 13, 2024

(87) PCT Pub. No.: WO2023/111976
PCT Pub. Date: Jun. 22, 2023

(65) Prior Publication Data
US 2025/0058552 A1      Feb. 20, 2025

(30) Foreign Application Priority Data

Dec. 17, 2021    (BE) .................................. 2021/5991

(51) Int. Cl.
| | |
|---|---|
| *B32B 27/12* | (2006.01) |
| *B32B 5/02* | (2006.01) |
| *B32B 7/12* | (2006.01) |
| *B32B 27/40* | (2006.01) |

(52) U.S. Cl.
CPC .............. *B32B 27/12* (2013.01); *B32B 5/024* (2013.01); *B32B 7/12* (2013.01); *B32B 27/40* (2013.01); *B32B 2250/02* (2013.01); *B32B 2250/24* (2013.01); *B32B 2305/188* (2013.01); *B32B 2307/3065* (2013.01); *B32B 2307/416* (2013.01); *B32B 2307/54* (2013.01); *B32B*

*2307/554* (2013.01); *B32B 2307/5825* (2013.01); *B32B 2307/718* (2013.01); *B32B 2603/00* (2013.01)

(58) Field of Classification Search
CPC ........... B32B 27/12; B32B 5/024; B32B 7/12; B32B 27/40; B32B 2250/02; B32B 2250/24; B32B 2305/188; B32B 2307/3065; B32B 2307/416; B32B 2307/54; B32B 2307/554; B32B 2307/5825; B32B 2307/718; B32B 2603/00; B32B 2262/0276; B32B 2274/00; F05B 2280/5001; F05B 2280/6002; F03D 1/0675
See application file for complete search history.

(56) References Cited

U.S. PATENT DOCUMENTS

| | | | | |
|---|---|---|---|---|
| 11,634,841 B2 * | 4/2023 | Hunt | ..................... | D06C 15/00 |
| | | | | 428/36.1 |
| 2014/0119933 A1 | 5/2014 | Bagepalli et al. | | |
| 2016/0184874 A1 * | 6/2016 | Schmid | ................ | D06N 3/0063 |
| | | | | 156/60 |
| 2016/0332417 A1 * | 11/2016 | Kawka | .................. | B32B 27/304 |
| 2025/0058552 A1 * | 2/2025 | Tuytens | ................... | B32B 7/12 |

FOREIGN PATENT DOCUMENTS

| | | | |
|---|---|---|---|
| WO | 2005050007 | A1 | 6/2005 |
| WO | 2017/064475 | A1 | 4/2017 |
| WO | 2023/111976 | A1 | 6/2023 |

* cited by examiner

*Primary Examiner* — J. T. Newton
(74) *Attorney, Agent, or Firm* — Vorys, Sater, Seymour and Pease LLP

(57) ABSTRACT

The present invention relates to a covering for rotor blades comprising a fabric and a protective top layer, the covering having a weight of up to 800 g/m², the covering having an elongation at break in both a warp and a weft direction of at least 20%, wherein the elongation at break is determined according to ISO 13934-1:2013, wherein the protective top layer is a film, and wherein the protective top layer is laminated to the fabric. The invention also relates to a use of the covering for covering rotor blades of a wind turbine.

19 Claims, No Drawings

TEXTILE COVERING FOR ROTOR BLADES AND USE OF THE TEXTILE COVERING

TECHNICAL FIELD

The invention relates to a covering for rotor blades, more particularly rotor blades of a wind turbine. The invention also relates to the use of the covering for covering rotor blades of a wind turbine.

PRIOR ART

Wind turbines for generating electricity from atmospheric air currents are now generally known. Wind turbines typically comprise a rotor with several aerodynamic rotor blades extending from a hub connected to a rotatable shaft. The rotor is oriented into the wind such that as air flows across the wind turbine rotor blades, a lift force is exerted on each rotor blade, causing the rotor and the shaft to rotate, and a generator to thereby generate electricity.

The power generated by a wind turbine is directly dependent on the effective surface area of the wind turbine rotor blades that is in contact with the airflow during the rotation of the rotor blades. Accordingly, wind turbines with longer rotor blades generate more power. However, as the rotor blade size increases, so does the weight of the rotor blades. There is therefore a need to develop rotor blades made of lighter materials, but which are still strong enough to withstand the forces exerted on a rotor blade, so that larger rotor blades can be constructed. This applies in particular to the development of the large, lightweight rotor blades required for the most modern wind turbines of 10 to 20 MW.

WO2017/064475 discloses a rotor blade for a wind turbine, comprising an outer covering and two internal support elements extending over the major part of the rotor blade. The outer covering comprises stretched textile which is connected to the two support elements. WO2017/064475 describes a laminated fabric as a covering for the rotor blades. The laminated fabric comprises two or more layers. Technora and Vectran are mentioned as suitable materials for the laminated fabric. These materials are light but have the disadvantage that they are not very UV-resistant, so that an additional UV protection layer is required to protect the covering against damage from UV light. This increases the weight of the covering. In addition, these materials are expensive and have a limited elongation, which is disadvantageous for the stretching of the covering on the support elements. Due to the limited elongation before breakage of the covering, it is recommended to add a mesh to the covering to give the covering sufficient strength. This is another extra layer that increases the weight of the covering. A coating has been applied to the covering to protect the covering and provide low air permeability. The disadvantage of such a coating is that it does not adhere well to the other layers of the laminated fabric, as a result of which the coating loses all or part of its good properties prematurely.

US2014/119933 describes a wind turbine rotor blade covered with a textile. A coating is also applied to this textile to obtain a surface with good aerodynamic properties. This increases the weight, and the coating can come off the textile.

WO2005/050007 relates to a wind turbine for generating energy. In this case too, the rotor blades of the turbine are covered with textile to which a coating has been applied.

The present invention aims to solve at least some of the above problems or drawbacks.

SUMMARY OF THE INVENTION

In a first aspect, the present invention relates to a covering for rotor blades comprising a fabric and a protective top layer, characterized in that the covering has a weight of at most 800 g/m2, that the covering has an elongation at break in both a warp direction and a weft direction of at least 20%, wherein the elongation at break is determined according to ISO 13934-1:2013, that the protective top layer is a film, and that the protective top layer is laminated to the fabric.

This covering is advantageous because it has a limited weight of no more than 800 g/m$^2$, making it extremely suitable for use with wind turbine rotor blades. In addition, the covering has an elongation at break of at least 20% in both warp and weft direction, as a result of which the covering can be stretched tautly over supporting elements of a rotor blade without the covering tearing. The covering further comprises a protective top layer film laminated to the fabric of the covering. The film protects the fabric and ensures a low air permeability of the covering. Because the film is laminated, the film is very strongly bonded to the fabric, so that the covering retains its good properties for very long periods.

A specific preferred embodiment concerns a device characterized in that weft and warp threads of the fabric comprise fire-retardant polyester.

Fire-retardant polyester weft and warp threads are advantageous because polyester yarns have a high elongation at break, which allows the fabric to be stretched taut over support elements of a rotor blade without the fabric tearing and without the need for a mesh. This reduces the weight of the rotor blade covering. Polyester yarns have a considerable resistance to UV light, which in combination with the protective top layer guarantees sufficient resistance to UV light and it is not necessary to apply an additional UV protection layer. This further reduces the weight of a rotor blade's covering. Finally, polyester yarns are cheap, which greatly reduces the material cost of a rotor blade. In a second aspect, the present invention relates to a use of the covering for wind turbine blade. This use results in a rotor blade with a very low weight and with good properties that are retained for a long period of time. The very low weight of the covering allows larger rotor blades, which leads to higher efficiency.

DETAILED DESCRIPTION

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, "a" and "the" refer to both the singular and the plural, unless the context presupposes otherwise. For example, "a segment" means one or more segments.

The terms "comprise," "comprising," "consist of," "consisting of," "provided with," "include," "including," "contain," "containing," are synonyms and are inclusive or open terms that indicate the presence of what follows, and which do not exclude or prevent the presence of other components, characteristics, elements, members, steps, as known from or disclosed in the prior art.

Quoting numerical ranges by endpoints includes all integers, fractions and/or real numbers between the endpoints, these endpoints included.

In the context of this document, "warp direction" means a direction in which warp threads extend in a fabric. Analogously, with "weft direction" is meant a direction in which weft threads extend in a fabric.

In a first aspect, the invention relates to a covering for rotor blades.

According to a preferred embodiment, the covering comprises a fabric and a protective top layer.

The fabric comprises weft and warp threads. The weft and warp threads are preferably selected from a group of para-aramids, such as Kevlar® and Twaron®, meta-aramids, such as Nomex® and Teijinconex®, and polyester yarns. These yarns have an average to high tensile strength per unit area, a low specific weight, considerable resistance to UV light, very good wear resistance and have good to very good resistance to sea water. This makes these yarns suitable for use in rotor blade coverings, even for wind turbines at sea.

The fabric has two opposing sides. The protective top layer forms an outer layer of the covering. The protective top layer is applied to one or both of the opposite sides of the fabric. Preferably, the protective top layer is applied to only one side of the fabric. This is advantageous in order to limit the weight of the covering. It will be apparent to one skilled in the art that with a covering with a protective top layer applied to only one side of the fabric, the side with the protective top layer forms an outside of the rotor blade.

The protective top layer protects the covering and in particular the fabric against external conditions, such as weather conditions, UV light, chemical reactions, etc. The protective top layer is advantageous for preserving good properties of the covering, as a result of which the life of the covering and consequently a rotor blade is extended.

The protective top layer is a film. In addition to protecting the covering and in particular the fabric, a film is also advantageous for a low air permeability of the covering, resulting in a higher efficiency in converting air flows into energy. The protective top layer is laminated to the fabric. A laminated film is particularly advantageous compared to a protective coating as a protective top layer, because the film has a very good adhesion to the fabric, resulting in a high resistance to erosion of the protective top layer under the influence of rainfall. This extends the life of the covering compared to using a coating as a protective top layer. The film is preferably of a material from a group of thermoplastic polyurethane (TPU), such as Elastollan®, ethylene-tetrafluoroethylene (ETFE), such as Tefzel®, Fluon® and Neoflon®, and polyvinyl fluoride (PVF), such as Tedlar®.

The covering has a weight of at most 800 g/m², preferably at most 600 g/m², more preferably at most 400 g/m², even more preferably at most 300 g/m², and even more preferably at most 250 g/m². Such a low weight is very suitable for use with rotor blades. The very low weight of the covering allows for larger rotor blades, which leads to a higher efficiency in converting air flows into energy.

The covering has an elongation at break in both warp and weft direction of the fabric of at least 20%. The elongation at break has been determined according to the standard ISO 13934-1:2013. Because the covering is at least 20% stretchable before the covering tears, the covering is suitable for taut stretching over support elements of a rotor blade.

According to a preferred embodiment, the protective top layer is a film comprising thermoplastic polyurethane (TPU). The thermoplastic polyurethane is preferably based on an aliphatic ester or an aliphatic ether. The thermoplastic polyurethane is more preferably based on an aliphatic ether. A film comprising thermoplastic polyurethane has good tensile strength, high elongation at break and good stretchability, making the covering suitable for stretching taut over supporting elements of a rotor blade. A film comprising thermoplastic polyurethane exhibits little creep or deformation under persistent mechanical stress. This is an important property for maintaining the shape of a rotor blade under constant wind loads. A film comprising thermoplastic polyurethane has a high tear strength, as a result of which the film does not immediately tear completely through after an initial tear. A film comprising thermoplastic polyurethane has good wear resistance, as a result of which the protective top layer has a long service life, even when the rotor blades are scraped a lot by the wind. A film comprising thermoplastic polyurethane is well protected against UV light, so that the protective top layer protects or additionally protects the fabric against UV light. As a result, it is not necessary to apply an additional UV protection layer, resulting in a lower weight for the covering. A film comprising thermoplastic polyurethane has a low degree of water absorption, as a result of which the weight of the covering only increases to a limited extent when it rains or when used in the sea. A film comprising thermoplastic polyurethane can be used in a wide temperature range. A film comprising thermoplastic polyurethane has good impact resistance, so the covering is not automatically damaged upon impact of an object on a rotor blade. A film comprising thermoplastic polyurethane is particularly advantageous compared to a film comprising ethylene-tetrafluoroethylene or polyvinyl fluoride, because a film comprising thermoplastic polyurethane has better adhesion to the fabric than a film comprising ethylene-tetrafluoroethylene or polyvinyl fluoride. A film comprising polyurethane adheres better to the fabric than a film comprising ethylene-tetrafluoroethylene or polyvinyl fluoride, even if the fabric has been corona treated on the side of the protective top layer and when using different adhesives.

Because a film comprising thermoplastic polyurethane adheres better to the covering, the covering retains its good properties longer and the covering therefore has a longer life.

Preferably, the film consists of thermoplastic polyurethane.

According to a preferred embodiment, the covering has an elongation at break in the warp direction which is at least 5 percentage points higher than in the weft direction. Preferably the elongation at break according to the warp direction is at least 6 percentage points higher than according to the weft direction, more preferably at least 7 percentage points higher, even more preferably at least 8 percentage points higher and even more preferably at least 9 percentage points higher.

The covering is applied according to the warp direction of the fabric in the longitudinal direction of a rotor blade. This is the largest dimension of a rotor blade, resulting in greater elongations and stresses in the covering in the warp direction. It is thus advantageous that the covering has a greater elongation at break along the warp direction in order to avoid tearing of the covering when tautly stretched over supporting elements of a rotor blade.

According to a preferred embodiment, the protective top layer is laminated to the fabric using a reactive aromatic or aliphatic fire-retardant polyurethane adhesive. The reactive aromatic or aliphatic polyurethane adhesive, for example, is fire-retardant by adding one or more fire-retardant additives to the adhesive. A reactive aromatic or aliphatic fire-retardant polyurethane adhesive is advantageous for good adhesion of the protective top layer to the fabric. This embodiment is particularly advantageous in combination with a previously discussed embodiment in which the protective top layer is a film of thermoplastic polyurethane (TPU). A reactive aromatic or aliphatic fire-retardant polyurethane adhesive is advantageous to prevent the covering from easily catching fire, for example in the event of a lightning strike on a wind turbine, which would destroy rotor blades.

According to a preferred embodiment, weft and warp threads of the fabric comprise fire-retardant polyester. Polyester weft and warp threads are advantageous compared to para-aramid weft and warp threads because polyester yarns have a high elongation at break, which allows the fabric to be stretched taut over the support elements of a rotor blade, without the fabric tearing and without the need for a mesh to strengthen the covering. Because no mesh is required, a covering and therefore a rotor blade with a lower weight is obtained. Due to the good resistance to UV light of polyester yarns, it is not necessary to apply an additional UV protection layer to the fabric, resulting in additional weight savings for the covering. The protective top layer and the polyester yarns together guarantee sufficient resistance to UV light. Finally, polyester yarns are cheap compared to weft and warp threads made of para-aramids and meta-aramids, which greatly reduces the material cost of a rotor blade.

The weft and warp threads are fire-retardant by, for example, adding one or more fire-retardant additives to the weft and warp threads or, for example, by applying one or more fire-retardant coatings to the weft and warp threads. This is advantageous in order to obtain a low combustibility of the weft and warp threads, just as with weft and warp threads made of para-aramids and meta-aramids. This is advantageous in order to prevent the covering from easily catching fire, for example in the event of a lightning strike on a wind turbine, which would destroy rotor blades.

According to a preferred embodiment, the weft and warp threads of the fabric have a tensile strength of at least 6.5 cN/dtex, preferably at least 6.75 cN/dtex, more preferably at least 7.0 cN/dtex, even more preferably at least 7.1 cN/dtex and even more preferably at least 7.2 cN/dtex. In this context, the tensile strength is equal to a force at which a weft or warp thread breaks in a tensile strength test. The actual tensile strength of a weft or warp thread is equal to the tensile strength in cN/dtex, multiplied by the yarn count of the weft or warp thread. Weft and warp threads with a tensile strength of at least 6.5 cN/dtex have a high actual tensile strength at a certain yarn count. Such weft or warp threads are referred to as "high tenacity" in the English language. Preferably, "high tenacity" weft or warp threads comprise filaments with a cross section comprising at least five vertices, preferably at least six vertices, more preferably at least seven vertices and even more preferably at least eight vertices. The filaments preferably comprise notches between the vertices. The cross-section of the filaments is preferably star-shaped.

This embodiment is particularly advantageous in combination with a previously described embodiment in which weft and warp threads of the fabric comprise fire-retardant polyester. Such "high tenacity" weft and warp threads comprising fire-retardant polyester have a greater tensile strength per unit area than meta-aramid weft and warp threads, again requiring no mesh to reinforce the covering, leading to an advantage similar to that in the previously described embodiment. According to a preferred embodiment, the weft and warp threads have a yarn count of at least 600 dtex, preferably at least 625 dtex, more preferably at least 650 dtex, even more preferably at least 675 dtex and even more preferably at least 700 dtex.

A weft and warp thread with a yarn count of at least 600 dtex is advantageous for obtaining a fabric with high tensile strength in both weft and warp directions. A high tensile strength is necessary to prevent the covering from tearing when the covering is stretched over supporting elements of a rotor blade. This is additionally advantageous in order to obtain a fabric, and consequently a covering, which is sufficiently strong to withstand continuous wind loads. This embodiment is particularly advantageous in combination with a previously described embodiment in which weft and warp threads have a tensile strength of at least 6.5 cN/dtex.

According to a further embodiment, the weft and warp threads have a yarn count of at most 1000 dtex, preferably at most 975 dtex, more preferably at most 950 dtex, even more preferably at most 925 dtex and even more preferably at most 900 dtex.

A weft and warp thread with a yarn count of at most 1000 dtex is advantageous for obtaining a fabric with a limited weight, so that a light covering is obtained.

According to a preferred embodiment, the fabric comprises at least 6 warp threads and at most 16 warp threads per cm.

The fabric preferably comprises at least 7 warp threads per cm, more preferably at least 8 warp threads per cm, even more preferably at least 9 warp threads per cm and even more preferably at least 10 warp threads per cm.

The fabric preferably comprises at most 15 warp threads per cm, more preferably at most 14 warp threads per cm, even more preferably at most 13 warp threads per cm and even more preferably at most 12 warp threads per cm.

More warp threads per cm ensure a strong fabric, and therefore a strong covering, in the warp direction. In addition, more warp threads per cm ensure a denser fabric, and therefore a lower air permeability of the fabric and thus of the covering. On the other hand, more warp threads per cm result in a higher weight. A number of warp threads according to this embodiment is advantageous for a strong fabric along the warp direction with a limited weight. This embodiment is particularly advantageous in combination with one or more previously described embodiments in which warp threads have a tensile strength of at least 6.5 cN/dtex and in which warp threads have a yarn count of at least 600 dtex.

According to a preferred embodiment, the fabric comprises at least 6 weft threads and at most 16 weft threads per cm.

The fabric preferably comprises at least 7 weft threads per cm, more preferably at least 8 weft threads per cm, even more preferably at least 9 weft threads per cm and even more preferably at least 10 weft threads per cm.

The fabric preferably comprises at most 15 weft threads per cm, more preferably at most 14 weft threads per cm, even more preferably at most 13 weft threads per cm and even more preferably at most 12 weft threads per cm.

This embodiment has similar advantages as an embodiment described above, wherein the fabric comprises at least 6 warp threads and at most 16 warp threads per cm. The fabric may, but need not, comprise the same number of weft and warp threads per cm. A different number of weft and warp threads is, for example, advantageous if different properties are desired for the fabric in the weft and warp direction.

According to a preferred embodiment, the fabric has a plain weave. A plain weave is a weave in which a weft thread alternates over and under a warp thread and in which a warp thread alternates over and under a weft thread. The plain weave is the strongest possible weave in weaving. This is advantageous for obtaining a strong fabric, and therefore a strong covering, for an equal weight of yarns.

According to a preferred embodiment, the fabric has a tensile strength in both the warp direction and the weft direction of at least 1800 N. The tensile strength of the fabric has been determined according to ISO 13934-1:2013. The tensile strength in both the warp direction and the weft direction is preferably at least 2000 N, more preferably at least 2200 N, even more preferably at least 2400 N and even more preferably at least 2450 N.

A tensile strength of at least 1800 N is important to prevent the fabric from breaking when stretching the covering over support elements of a rotor blade. A tensile strength of at least 1800 N for the fabric is also advantageous in order to prevent the covering from tearing under continuous wind loads.

According to a further embodiment, the fabric has a tensile strength according to the warp direction which is at least 50 N higher than according to the weft direction. Preferably the tensile strength according to the warp direction is at least 60 N higher than according to the weft direction, more preferably at least 70 N higher, even more preferably at least 80 N higher and even more preferably at least 90 N higher.

The covering is applied according to the warp direction of the fabric in the longitudinal direction of a rotor blade. This is the largest dimension of a rotor blade, resulting in greater elongations and stresses in the covering in the warp direction. It is therefore advantageous that the fabric has a greater tensile strength along the warp direction in order to withstand the greater stresses.

An additional advantage is that due to a lower tensile strength according to the weft direction, the fabric of the covering can be made lighter in the weft direction, for example due to fewer weft threads per cm or due to weft threads with a lower yarn count than the yarn count of the warp threads, resulting in a lighter fabric and consequently a lighter covering being obtained.

According to a preferred embodiment, the covering can withstand a tear force of at least 70 N in a test according to ISO 13937-2:2000 in both the warp direction and the weft direction. Preferably, the covering can withstand a tear force of at least 80 N, more preferably at least 90 N, even more preferably at least 100 N and even more preferably at least 110 N, in a test according to ISO 13937-2:2000, according to both the warp direction and the weft direction.

The test according to ISO 13937-2:2000 determines how well a piece of textile resists further tearing out of a tear in the textile. It is advantageous that the covering can withstand a tensile force of at least 100 N in both warp and weft direction if there is a tear in the covering to avoid a small tear, for example, through contact with a foreign object hitting a rotor blade, immediately tearing open further, so that the covering of the rotor blade must be repaired immediately.

According to a further embodiment, in a test according to ISO 13937-2:2000, the covering in the warp direction can withstand a tear force that is at least 5 N higher than in an equivalent test in the weft direction. Preferably, in a test according to ISO 13937-2:2000, the covering in the warp direction can withstand a tear force that is at least 6 N higher than in a test in the weft direction, more preferably at least 7 N higher, even more preferably at least 8 N higher and even more preferably at least 9 N higher.

This embodiment has advantages similar to those mentioned in a previously described embodiment in which the covering has a tear force according to the warp direction which is at least 50 N higher than according to the weft direction.

According to a preferred embodiment, the covering has a reflectivity of less than 30 GU at an angle of 60°. GU in the context of this document means "Gloss Units." The reflectivity has been determined according to ISO 2813:2014.

Wind turbine rotor blades have a huge surface area. These rotor blades form reflectors for sunlight, so that people and birds can be dazzled by reflected sunlight both at sea and on land. It is the intention to cover even larger rotor blades with a length of, for example, 78 m with a covering according to the present invention, as a result of which this problem becomes even greater. Current textile coverings have a reflectivity of at least 60 GU. This high reflectivity is partly due to the use of coatings to protect the covering against, for example, UV light. As previously described, the use of such coatings in a covering according to the present invention is superfluous. This allows a reflectivity of less than 30 GU to be achieved, which is beneficial for reducing the risk of glare.

According to a preferred embodiment, the covering has a glass transition point of at least 65° C.

Glass transition point or glass transition temperature (TG) defines a temperature above which a polymer softens when heated. Wind turbines are set up in open spaces in order to direct as much wind as possible over the rotor blades of the wind turbines. As a result, the rotor blades are exposed to solar radiation and the rotor blades heat up severely. A covering with a glass transition point of at least 65° C. is advantageous in order to prevent the stretched covering from becoming soft and deformed due to heating by the sun's rays, causing the rotor blades to lose their optimal profile and become less efficient.

According to a preferred embodiment, the covering on one side of the fabric, opposite a side on which the protective top layer has been applied, has a wear resistance of at least one hundred thousand cycles. The wear resistance has been determined according to ISO 12947-2:2016. In this embodiment, the protective top layer is applied to only one side of the fabric.

Rotor blade coverings constantly rub against underlying support elements under the influence of rotational forces. The underlying support elements have a composite structure based on glass fiber reinforced resins. The covering on a side of the fabric opposite a side to which the protective top layer has been applied, rubs over protruding glass fibers in the underlying support elements. This embodiment is particularly advantageous in order to prevent the covering from wearing out quickly.

According to a preferred embodiment, there is an adhesive force between the protective top layer and the fabric of at least 80 N/50 mm, preferably at least 90 N/50 mm, more preferably at least 100 N/50 mm, even more preferably at least 110 N/50 mm and even more preferably at least 120 N/50 mm. The adhesive force is determined according to ISO 2411:2017.

During the test, the protective top layer of the fabric is peeled off. The covering, the peeled-off protective top layer and the fabric from which the protective top layer has been peeled off form a T, where the covering is the standing leg of the T and the peeled-off protective top layer and the fabric from which the protective top layer has been peeled off extend in line and form the lying leg of the T. The adhesive force is the average of all test results, where a test result is calculated as a median of all peaks of the force required to peel the protective top layer from the fabric during a test. The adhesive force is expressed in N per 50 mm width of the covering.

An adhesive force of 80 N/50 mm is advantageous to prevent the protective top layer from peeling further from the fabric at an edge of the covering or an initial tear under the influence of external conditions, causing the covering to lose its good properties.

According to a preferred embodiment, the covering has a thickness of at most 0.50 mm, preferably at most 0.40 mm, even more preferably at most 0.35 mm and even more preferably at most 0.30 mm.

A covering with a thickness of at most 0.50 mm is advantageous for taut stretching of the covering on supporting elements of a rotor blade. A covering with a thickness of at most 0.50 mm is also advantageous for a minimum weight of the covering. This embodiment is also advantageous for compactly rolling up a covering of a rotor blade, so that a rotor blade can be constructed and transported in a modular manner and covering can be applied after transport.

According to a preferred embodiment, the covering is self-extinguishing. The covering complies with standard UL 94, edition 6, revision 6 May 2021. The covering meets the requirements for class V1 according to the stated standard, preferably class V0. This is advantageous in order to prevent the covering from easily catching fire, for example in the event of a lightning strike on a wind turbine, which would destroy rotor blades.

According to a preferred embodiment, the weight of the covering increases by water absorption by at most 10%, preferably by at most 9%, more preferably by at most 8%, even more preferably by at most 7% and even more preferably by at most 6%. The weight gain of the covering due to water absorption was determined according to ASTM D570-98:2018. This is advantageous because less margin is required in the construction of a rotor blade to prevent a rotor blade from becoming too heavy due to water absorption and breaking.

According to a preferred embodiment, the covering has a surface roughness $R_z$ of less than 15 µm, preferably less than 12 µm, more preferably less than 9 µm, even more preferably less than 8 µm and even more preferably less than 7 µm.

The surface roughness is determined according to ISO 4287:1997. A surface roughness of less than 15 µm is advantageous in order to avoid turbulences around a rotor blade, which causes wind to be converted into energy less efficiently.

According to a preferred embodiment, the covering has a resistivity of at least $10^6$ ohms, preferably at least $10^8$ ohms, more preferably at least $10^{10}$ ohms, even more preferably at least $10^{12}$ ohms and even more preferably at least $10^{13}$ ohms. A resistivity of at least $10^6$ ohms is advantageous in order to prevent covering and therefore a rotor blade from being electrically conductive, so that, for example, a rotor blade is a good conductor for a lightning strike or that a person runs the risk of electrocution when touching a rotor blade. The resistivity is determined according to ISO 1149-1:2006.

According to a preferred embodiment, the covering has a surface resistance of at most $10^9$ ohms, preferably at most $10^8$ ohms and even more preferably at most $10^7$ ohms. The surface resistance is determined according to ISO 1149-1: 2006. A surface resistance of at most $10^9$ ohms is advantageous for avoiding the build-up of electrostatic charge, such as from the rotation of wind turbine rotor blades.

According to a preferred embodiment, the covering consists of the fabric, the protective top layer and adhesive layer.

The fabric is according to previously described embodiments. The protective top layer is as previously described embodiments. The adhesive layer comprises an adhesive as in previously described embodiments. The adhesive layer is a layer between the fabric and the protective top layer. This embodiment is particularly advantageous because the covering comprises only three layers, so that a minimum weight is achieved due to the lack of additional layers, while the advantageous properties of the covering according to the present invention are maintained.

In a second aspect, the invention relates to a use of a covering according to the first aspect for covering rotor blades of a wind turbine.

This use results in a rotor blade with a very low weight and with good properties that are retained for a long period of time. The very low weight of the covering allows larger rotor blades, which leads to a higher efficiency of the wind turbine.

In what follows, the invention is described by way of non-limiting examples illustrating the invention, and which are not intended to and should not be interpreted as limiting the scope of the invention.

EXAMPLES

The invention will now be further explained on the basis of the following example, without however being limited to this.

Example 1

Example 1 concerns a covering consisting of a fabric with "high tenacity" fire-retardant polyester weft and warp threads, a thermoplastic polyurethane film as a protective top layer and a reactive aromatic fire-retardant polyurethane adhesive as an adhesive layer between the fabric and the protective top layer.

The fabric comprises 10 weft threads per cm and 10 warp threads per cm. The yarn count of the weft threads and the warp threads is 700 dtex and the weft and warp threads have a tensile strength of at least 8.0 cN/dtex. The fabric has a plain weave.

The weight of the covering is 238 g/m$^2$ and the covering has a thickness of 0.29 mm. The covering has a tensile strength in the warp direction of 2300 N and in the weft direction of 2200 N, determined according to ISO 13934-1:2013. The covering has an elongation at break in the warp direction of 31% and in the weft direction of 23%, determined according to ISO 13934-1:2013. In a test according to ISO 13937-2:2000, the covering can withstand a tensile force of 130 N in the warp direction and a tensile force of 120 N in the weft direction.

The adhesion of the protective top layer to the fabric is very good. The adhesive force is at least 90 N/50 mm.

The invention claimed is:

1. Covering for rotor blades comprising a fabric and a protective top layer, wherein:

the covering has a weight of at most 800 g/m2, the covering has an elongation at break in both a warp direction and a weft direction of at least 20%, wherein the elongation at break is determined according to ISO 13934-1:2013, the protective top layer is a film, and the protective top layer is laminated to the fabric.

2. Covering according to claim 1, wherein the protective top layer is a film comprising thermoplastic polyurethane.

3. Covering according to claim 1, wherein the protective top layer is laminated to the fabric with the aid of a reactive aromatic or aliphatic fire-retardant polyurethane glue.

4. Covering according to claim 1, wherein weft and warp threads of the fabric comprise fire-retardant polyester.

5. Covering according to claim 1, wherein the weft and warp threads have a tensile strength of at least 6.5 cN/dtex.

6. Covering according to claim 1, wherein the weft and warp threads have a yarn count of at least 600 dtex.

7. Covering according to claim 1, wherein the fabric comprises at least 6 warp threads and at most 16 warp threads per cm and at least 6 weft threads and at most 16 weft threads per cm.

8. Covering according to claim 1, wherein the fabric has a plain weave.

9. Covering according to claim 1, wherein the fabric has a tensile strength according to both the warp direction and the weft direction of at least 1800 N, the tensile strength being determined in accordance with ISO 13934-1:2013.

10. Covering according to claim 1, wherein the fabric can withstand a tear force of at least 70 N in a test according to ISO 13937-2:2000 in both the warp direction and the weft direction.

11. Covering according to claim 1, wherein the covering has a reflectivity of less than 30 GU at an angle of 60°, determined according to ISO 2813:2014.

12. Covering according to claim 1, wherein the fabric comprises a polymeric fabric, the protective top layer comprises a polymer, and the covering has a glass transition point of at least 65° C.

13. Covering according to claim 1, wherein the covering a side of the fabric, lying opposite a side to which the protective top layer has been laminated, has a wear resistance of at least one hundred thousand cycles, determined according to ISO 12947-2:2016.

14. Covering according to claim 1, wherein there is an adhesive force of at least 80 N/50 mm between the protective top layer and the fabric, determined according to ISO 2411:2017.

15. Use of a covering for covering wind turbine rotor blades, wherein the covering for rotor blades comprises a fabric and a protective top layer, wherein:

the covering has a weight of at most 800 g/m2, that the covering has an elongation at break in both a warp direction and a weft direction of at least 20%, wherein the elongation at break is determined according to ISO 13934-1:2013, that the protective top layer is a film, and that the protective top layer is laminated to the fabric.

16. A rotor blade, comprising:

a covering, consisting of:

a fabric comprising a polymer, a polymeric protective top layer, which is a film and is laminated to the fabric, and an adhesive layer between the fabric and the protective top layer, wherein:

the covering has a weight of at most 800 g/m2, the covering has an elongation at break in both a warp direction and a weft direction of at least 20%, wherein the elongation at break is determined according to ISO 13934-1:2013.

17. The rotor blade according to claim 16, wherein the polymeric protective top layer comprises thermoplastic polyurethane.

18. The rotor blade according to claim 16, wherein the fabric comprises weft and warp threads comprising a fire-retardant polyester.

19. The rotor blade according to claim 16, wherein the adhesive layer comprises a reactive aromatic or aliphatic fire-retardant polyurethane glue.

* * * * *